US008886114B2

(12) United States Patent
Mildh et al.

(10) Patent No.: US 8,886,114 B2
(45) Date of Patent: Nov. 11, 2014

(54) APPLICATION OF SYSTEM INFORMATION CHANGES BY RELAYS

(75) Inventors: Gunnar Mildh, Sollentuna (SE); Jessica Östergaard, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 555 days.

(21) Appl. No.: 13/090,471

(22) Filed: Apr. 20, 2011

(65) Prior Publication Data

US 2011/0269394 A1 Nov. 3, 2011

Related U.S. Application Data

(60) Provisional application No. 61/330,636, filed on May 3, 2010.

(51) Int. Cl.
H04B 7/15 (2006.01)
H04B 7/155 (2006.01)
H04W 24/02 (2009.01)
H04B 7/26 (2006.01)
H04W 72/12 (2009.01)
H04W 84/04 (2009.01)

(52) U.S. Cl.
CPC ............ H04W 24/02 (2013.01); H04B 7/155 (2013.01); *H04B 7/2606* (2013.01); *H04W 72/1289* (2013.01); *H04W 84/047* (2013.01)
USPC ...................................... 455/11.1; 455/456.1

(58) Field of Classification Search
USPC ............. 455/11.1, 13.1, 15, 16, 69, 522
See application file for complete search history.

(56) References Cited

U.S. PATENT DOCUMENTS

| 6,718,158 B1 * | 4/2004 | Suonvieri .................. 455/9 |
| 2005/0048914 A1 * | 3/2005 | Sartori et al. ............. 455/11.1 |
| 2010/0097978 A1 | 4/2010 | Palanki et al. |

(Continued)

FOREIGN PATENT DOCUMENTS

| WO | 2005117297 A1 | 12/2005 |
| WO | 2009108768 A1 | 9/2009 |

OTHER PUBLICATIONS

3rd Generation Partnership Project, Source NTT Docomo, Inc., "System Information Change Notification in Relay Operation," 3GPP TSG-RAN WG2 #68bis, R2-100259, pp. 1-2, Jan. 18-22, 2010, Valencia, Spain.

(Continued)

*Primary Examiner* — Tu X Nguyen
(74) *Attorney, Agent, or Firm* — Coats & Bennett, PLLC

(57) ABSTRACT

Teachings herein include a base station and a relay node for propagating system information changes from the base station to the relay node. Upon receiving changes from the base station, the relay node advantageously determines whether to apply the changes immediately or to defer application until a set time period. The relay node then applies the changes at a time in accordance with that determination. In some embodiments, the relay node employs deferred application for fundamental changes (those changes that would fatally disrupt ongoing communications if applied before the set time period), but employs immediate application for non-fundamental changes in order to minimize relay node complexity. Regardless, the relay node may make the determination based on preconfigured rules, or on control indicators received from the base station. Correspondingly, the base station may generate the control indicators to explicitly direct the relay node to employ immediate application or deferred application.

16 Claims, 3 Drawing Sheets

(56) References Cited

U.S. PATENT DOCUMENTS

| | | |
|---|---|---|
| 2011/0044233 A1 | 2/2011 | Cho et al. |
| 2011/0222428 A1 | 9/2011 | Charbit et al. |
| 2012/0008550 A1 | 1/2012 | Chen et al. |
| 2012/0069790 A1 | 3/2012 | Chung et al. |
| 2012/0093071 A1 | 4/2012 | Huang et al. |
| 2012/0287836 A1 | 11/2012 | Lee et al. |

OTHER PUBLICATIONS

3rd Generation Partnership Project, Source ZTE, "Considerations on the Timing Relationship Between Un Reconfiguration and Uu SI Update," 3GPP TSG RAN WG2 #69bis, R2-102220, pp. 1-3, Apr. 12-16, 2010, Beijing, CN.

3rd Generation Partnership Project. 3GPP TS 36.331, V8.5.0 (Mar. 2009) 3rd Generation Partnership Project; Technical Specification Group Radio Access Network; Evolved Universal Terrestrial Radio Access (E-UTRA) Radio Resource Control (RRC); Protocol specification (Release 8), Mar. 2009.

3rd Generation Partnership Project. "Relays for LTE—Performance Part." 3GPP Work Item Description, RAN WG4, R9-091434, Dec. 4, 2009.

3rd Generation Partnership Project. "System Information Notification in RN." 3GPP TSG RAN WG2 Meeting #69bis, R2-102029, Beijing, China, Apr. 12-16, 2010.

3rd Generation Partnership Project. "BCH Reception in Relay Operation." 3GPP TSG-RAN WG2 #69bis, R2-102336, Beijing, China, Apr. 12-16, 2010.

3rd Generation Partnership Project. "System Information Modicaition for Relay Node." 3GPP TSG-RAN WG2 #69bis, R2-102336, Beijing, China, Apr. 12-16, 2010.

Ericsson et al., "Acquisition of DeNB system information updates for relay nodes", 3GPP TSG-RAN WG2 #70, May 10-14, 2010, Montreal, Canada, Tdoc R2-103159.

3rd Generation Partnership Project, 3GPP TS 36.331, V10.0.0 (Dec. 2010); 3rd Generation Partnership Project; Technical Specification Group Radio Access Network; Evolved Universal Terrestrial Radio Access (E-UTRA); Radio Resource Control (RRC); Protocol specification (Release 10).

* cited by examiner

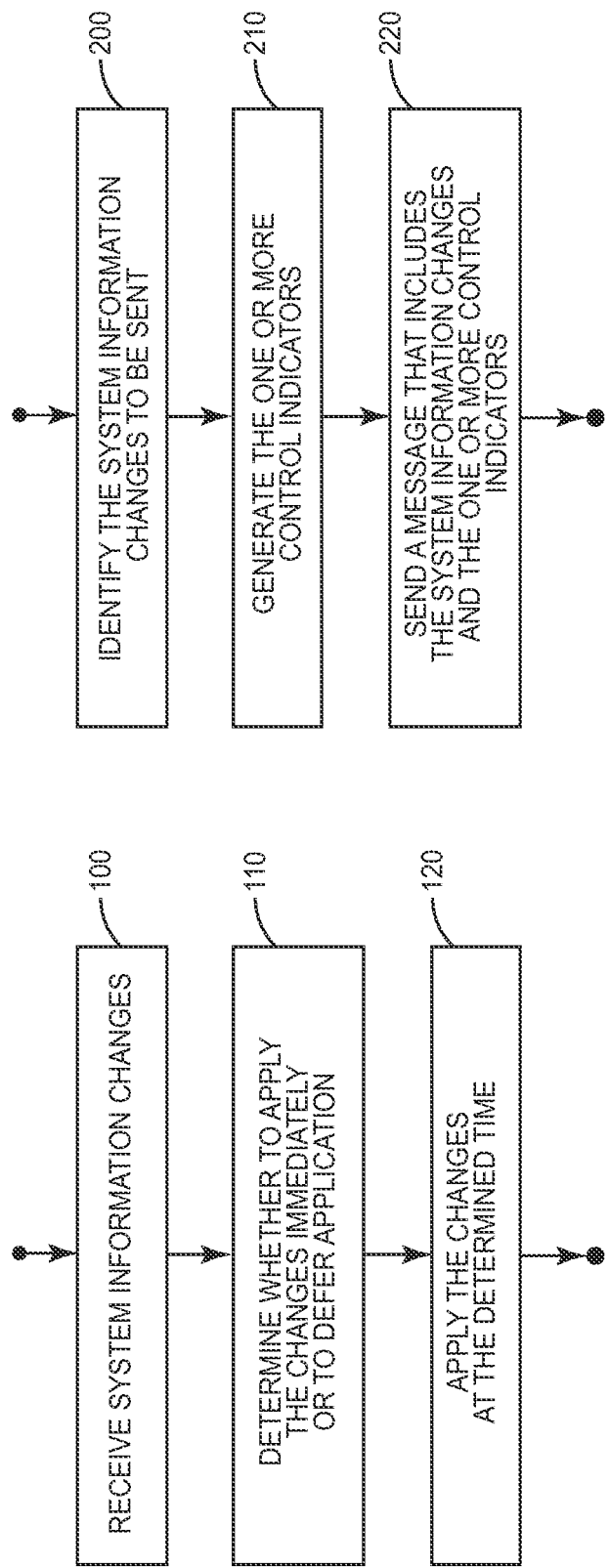

APPLICATION OF SYSTEM INFORMATION CHANGES BY RELAYS

RELATED APPLICATIONS

This application claims priority to U.S. provisional patent application Ser. No. 61/330,636, filed May 3, 2010, and to International patent application No. PCT/SE2011/050387, filed Apr. 1, 2011, each of which is incorporated by reference herein in its entirety.

TECHNICAL FIELD

The present invention relates generally to wireless communication systems and more particularly relates to changing system information in wireless communication systems that support relay nodes.

BACKGROUND

The 3rd-Generation Partnership Project (3GPP) is currently standardizing relay nodes for the Long Term Evolution (LTE) radio access technology. From a radio propagation perspective, a relay node is positioned between a base station (called an eNodeB in the LTE standard) and one or more mobile terminals (called user equipment, UE, in the LTE standard). This way, communications between the base station and the mobile terminals are relayed by the relay node.

Specifically, a relay node connects to an associated base station using the same, standard radio link used by ordinary mobile terminals. The relay node then provides radio access to mobile terminals, effectively emulating a base station from the perspective of the mobile terminals, and uses its radio link to the base station as backhaul transport for terminal data.

While relay nodes improve system coverage and capacity, the nodes introduce complexities to the process of propagating system information changes throughout the system. System information includes parameters that describe general information about the system, including the Public Land Mobile Network (PLMN) ID, the system bandwidth, and the like. System information also includes parameters that describe information specific to certain cells in the system, such as the allocation of control channels, paging channel information, cell selection information, and so on.

Known approaches to propagating changes in system information parameters throughout systems that do not support relay nodes effectively ensure that a base station and its associated mobile terminals apply the changes at the same time. In this regard, the base station and terminals are configured to only apply system information changes during or at the start of predefined modification periods that recur periodically. When system information is to be changed, the base station sends a change notification to the terminals over a paging channel. The change notification informs the terminals that the base station will be broadcasting system information changes at the start of the next modification period. When that period eventually starts, the base station broadcasts the changes, and applies the changes itself. The terminals immediately apply the changes upon receipt so that the changes are applied at approximately the same time as when the base station applies them.

Complexities occur in systems that support relay nodes because the relay nodes may not be able to receive the change notification sent by the base station over the paging channel. Moreover, even if relay nodes are able to receive the change notification, the relay nodes may still not be able to receive the actual changes subsequently broadcasted. For example, relay nodes may transmit and receive using the same frequency band. These "in-band" relay nodes are therefore configured to receive transmissions from the base station during certain time slots (i.e., "downlink time slots"), and to transmit to the mobile terminals during other time slots (i.e., "uplink time slots"). If the base station transmits a change notification or actual changes during an uplink time slot, the relay node will not receive that notification or those changes.

Known proposals suggest transmitting system information changes to a relay node over a dedicated channel, so that the relay node can at least receive the changes. However, a problem still remains as to the most appropriate time at which the relay node should apply the changes.

SUMMARY

Teachings herein include a relay node that advantageously determines whether to apply received system information changes immediately upon reception or at a later time. In determining when to apply received changes in this way, rather than invariably applying the changes at a particular time, the relay node as explained more fully below preserves any ongoing communications while minimizing relay node complexity.

In one or more embodiments, the relay node includes a first interface, a second interface, and a system information processor. The first interface is an interface towards one or more mobile terminals, and is configured to relay communications from a base station to those one or more mobile terminals, e.g., via a radio link. The second interface is an interface towards the base station, and is configured to receive these relayed communications, as well as other communications actually destined for the relay node itself, from the base station. In this regard, the second interface is configured to receive a message from the base station that includes system information changes. System information changes as used herein refer to changes in operational parameters of the supporting wireless communication system (e.g., the system bandwidth, allocation of control channels, and the like).

Having received these system information changes, the system information processor advantageously determines an appropriate time at which to apply the changes. Specifically, the system information processor determines whether to apply the received system information changes immediately, or to defer application until a set time period. Then, the system information processor applies the received changes at a time in accordance with that determination. The processor may thus dynamically switch between immediate application and deferred application of received system information changes, and thereby apply any given change at different times, e.g., under different circumstances.

The system information processor may make the determination between immediate application and deferred application on a message-by-message basis, i.e., collectively for all system information changes included in the received message, or on a change-by-change basis, i.e., for individual changes included in the received message. In at least one embodiment, the system information processor distinguishes between different changes in this way by recognizing changes as belonging to one of a plurality of different classes. These different classes may categorize system information changes based on the general type of system information being changed.

For example, in some embodiments, system information changes that would fatally disrupt ongoing communications if applied before the set time period may be classified as fundamental changes, with other system information changes being classified as non-fundamental. In this case, the system information processor may be configured to identify whether or not each received change belongs to a fundamental class or a non-fundamental class. Then, the processor determines, for each change, whether to apply the change immediately or to defer application of that change, based on the class to which the change belongs. If a change belongs to the non-fundamental class, the processor determines to apply the change immediately. This minimizes relay node complexity without jeopardizing ongoing communications. However, if the change belongs to the fundamental class (meaning that the relay node cannot minimize complexity using immediate application, at least without jeopardizing ongoing communications), the processor determines to defer application until the set time period.

In some embodiments, the system information processor makes the determination between immediate and deferred application of received changes based on rules that are preconfigured in the relay node. Such rules may specify, for example, which changes belong to which classes (e.g., fundamental or non-fundamental). The rules may alternatively or additionally specify certain conditions under which the processor is to employ immediate application, and other conditions under which the processor is to employ deferred application. The conditions may include the current load of the relay node and/or quality of service requirements of one or more mobile terminals.

In other embodiments, the system information processor makes the determination between immediate and deferred application of received changes based on one or more explicit control indicators received from the base station. Thus, the system information processor's determination in these embodiments entails interpreting or otherwise recognizing control indicators received from the base station that explicitly direct the relay node to employ immediate application or deferred application.

Correspondingly, the base station herein may be configured to generate the one or more control indicators in any of the ways described above with respect to the relay node. In some embodiments, for instance, the base station includes an interface towards a relay node and a system information controller. The interface towards the relay node is of course configured to communicate with the relay node. The controller is configured to identify system information changes to be sent to the relay node. The controller then generates one or more control indicators that indicate whether the relay node is to apply the identified system information changes immediately upon reception of those changes, or to defer application until a set time period. Finally, the controller sends to the relay node, via the interface, one or more messages that include the identified system information changes and the one or more control indicators.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a logic flow diagram that illustrates a method implemented by a relay node according to one or more embodiments for relaying communications between a base station and one or more mobile terminals.

FIG. 4 is a logic flow diagram that illustrates a method implemented by a base station according to one or more embodiments for propagating system information changes to a relay node.

DETAILED DESCRIPTION

Figure 1:
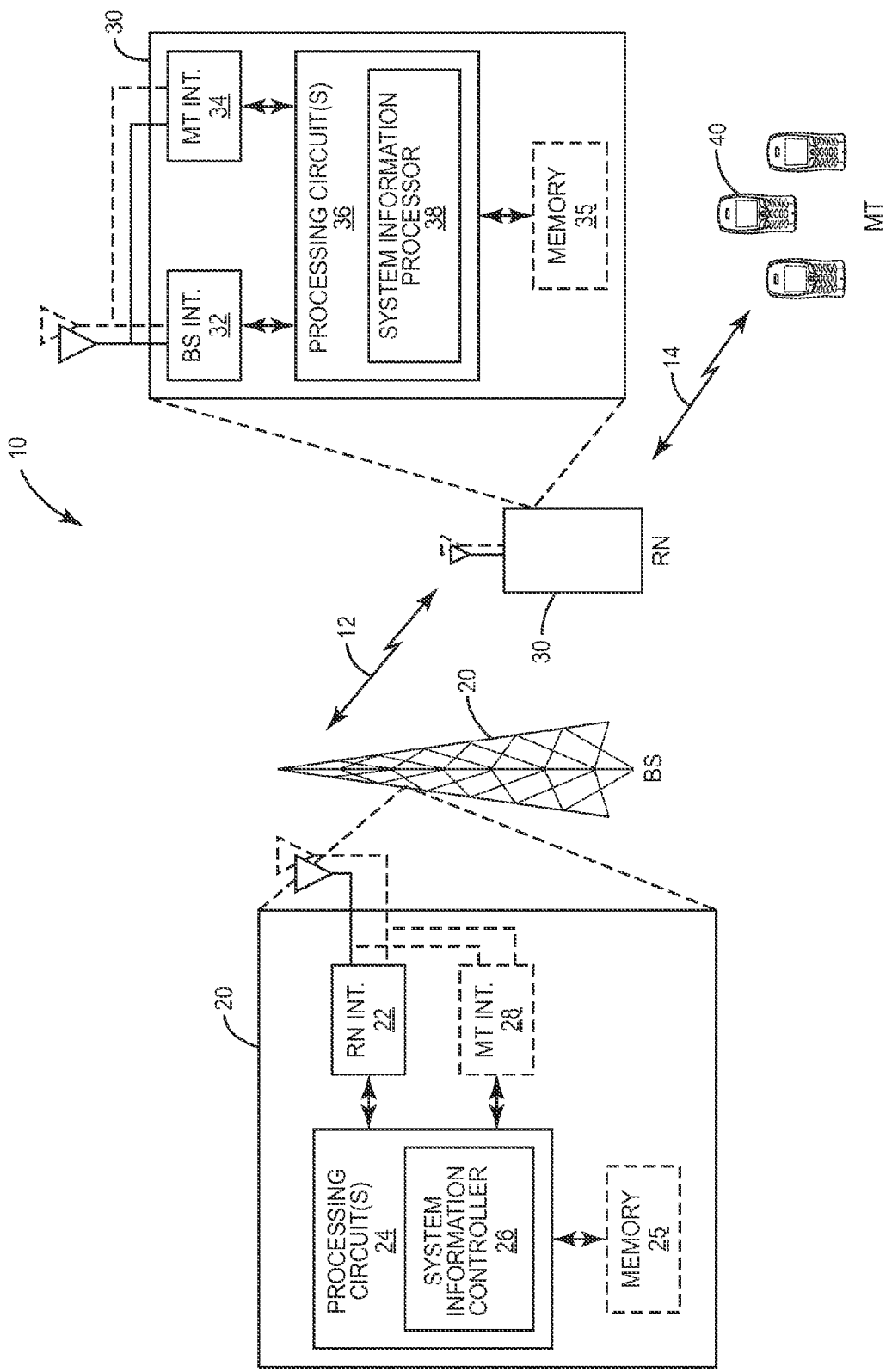
FIG. 1 is a block diagram of a wireless communication system that includes a relay node and a base station configured according to one or more embodiments of the present invention for propagating system information changes to the relay node.

FIG. 1 depicts a wireless communication system 10 configured to support relay services. The system 10 includes a base station 20, a relay node 30, and one or more mobile terminals 40.

The relay node 30 includes interface 32 and interface 34. These interfaces 32, 34 may include, for example, radiofrequency transceiver circuitry, for sending and receiving control and data signals. Interface 32 in particular is an interface towards the base station 20. The interface 32 is configured to receive communications from the base station 20 over radio link 12. Interface 32 is an interface towards the one or more mobile terminals 40. The interface 32 is configured to relay at least some of the communications received from the base station 20 to the one or more mobile terminals 40, via radio link 14. Other communications received from the base station 20 may in fact be destined for the relay node 30 itself, e.g., certain control signaling.

In this regard, interface 32 is particularly configured to receive a message from the base station 20 that includes system information changes. System information changes as used herein refer to changes in operational parameters of the wireless communication system 10. System information changes thus include changes in parameters that generally describe information about the system 10, including the Public Land Mobile Network (PLMN) ID, the system bandwidth, and the like. System information changes also include changes in parameters that describe information specific to certain cells in the system 10, such as the allocation of control channels, paging channel information, cell selection information, neighboring carrier or cell information, information regarding barring of certain services, and so on.

Having received these system information changes, the relay node 30 advantageously determines an appropriate time at which to apply the changes. Such application entails, in some embodiments, updating one or more parameters stored at the relay node 30, e.g., in memory 35. Interface 32 and interface 34 may communicate with the base station 20 and mobile terminals 40 over radio links 12 and 14 in accordance with these stored parameters. The specific time at which the relay node 30 applies the received system information changes, and updates the stored parameters, may thus in some cases bear on whether or not ongoing communications with the base station 20 or mobile terminals 40 are interrupted. The specific time may also bear on the complexity involved at the relay node 30 in maintaining the parameters in memory 35.

To apply system information changes at a time that preserves any ongoing communications while minimizing relay node complexity, the relay node's processing circuits 36 includes a system information processor 38. This system information processor 38 is configured to determine whether to apply the received system information changes immediately, or to defer application until a set time period. Then, the system information processor 38 applies the received system information changes at a time in accordance with that determination. The system information processor 38 may thus dynamically switch between immediate application and deferred application of received system information changes, and thereby apply any given change at different times, e.g., under different circumstances.

Note that the system information processor 38 may make the determination between immediate application and deferred application on a message-by-message basis, i.e., collectively for all system information changes included in the received message, or on a change-by-change basis, i.e., for individual changes included in the received message. Thus, in the latter case, the system information processor 38 may determine to apply some changes included in the received message immediately, but to defer application of other changes included in that received message.

In at least one embodiment, the system information processor 38 distinguishes between different changes in this way by recognizing changes as belonging to one of a plurality of different classes. These different classes may categorize system information changes, for example, based on the general type of system information being changed (e.g., system-wide information versus cell-specific information, or, as explained in more detail below, fundamental information versus non-fundamental information). Thus, upon receiving a message including system information changes, the processor 38 identifies to which of a plurality of different classes each change belongs. Then, the processor 38 determines, for each change, whether to apply the change immediately or to defer application of that change, based on the class to which the change belongs.

In some embodiments, the set time period associated with deferred application of system information changes is "set" in the sense that it is an interval of time starting at a set point in time and continuing for a set duration. Deferral until such a set time period entails deferring application of system information changes until at least the set point in time at which the time period starts. Deferred application may therefore actually occur at any point in time within the set time period, whether that be the start of the time period, the end of the time period, or any time in between.

Figure 2:
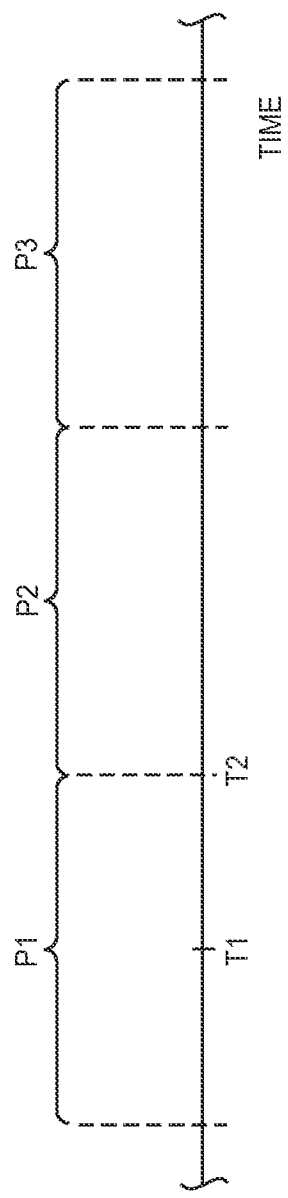
FIG. 2 is a timeline that illustrates immediate application and deferred application of system information changes in the context of embodiments involving a series of recurring modification periods.

For example, in one or more embodiments, the set time period at which deferred application occurs comprises the next time period in a series of time periods that recur with a periodicity set by the system 10. Each of these recurring time periods is referred to herein as a modification period. FIG. 2 illustrates a simple example of embodiments involving modification periods.

In FIG. 2, several modification periods P1-P3 are shown. According to this example, interface 32 receives a message including system information changes at time T1, i.e., during the middle of modification period P1. The system information processor 38 then determines whether to apply those system information changes immediately (at time T1, allowing of course for some practical processing delays) or to defer application until the next modification period P2 (e.g., at or after time T2, the start of modification period P2).

Regardless, if the set periodicity of modification periods is known throughout the system 10, the periods can help coordinate synchronous application of system information changes among the base station 20, relay node 30, and/or mobile terminals 40. Indeed, in various embodiments, both the base station 20 and the mobile terminals 40 are themselves configured to apply system information changes at the next modification period (e.g., at or after time T2). Thus, in determining whether to apply received system information changes immediately or to defer application until the next modification period, the system information processor 38 of the relay node 30 effectively determines whether to apply the changes independently of the base station 20 and/or mobile terminals 40, or to apply the changes synchronously with the base station 20 and mobile terminals 40.

In these and other embodiments, deferring application of system information changes (e.g., applying the changes synchronously with the base station 20 and/or mobile terminals 40) ensures preservation of any ongoing communications with the base station 20 and/or mobile terminals 40. However, the deferral increases the complexity involved at the relay node 30 because the relay node 30 must effectively maintain two different sets of system information parameters in memory 35, the set associated with the current system information and the set associated with the pending system information changes. This causes problems particularly when the relay node 30 receives control signaling related to the pending system information changes.

According to some embodiments, therefore, the system information processor 38 decides to apply received system information changes immediately if possible to do so without fatally disrupting ongoing communications. Such minimizes relay node complexity, while also preserving ongoing communications. Otherwise, if ongoing communications would be fatally disrupted, the system information processor 38 decides to defer application until the set time period (e.g., the next modification period).

In general, system information changes that would fatally disrupt ongoing communications may be classified as fundamental changes, with other system information changes being classified as non-fundamental. Examples of fundamental changes include cell bandwidth, control channel allocation (e.g., Physical Uplink Control Channel, PUCCH, in LTE), and other essential information (e.g., Random Access Channel, RACH, in LTE). On the other hand, examples of non-fundamental changes include uplink power control parameters, common time alignment timer parameters, and certain cell-specific information, such as sounding reference signal configuration. If the relay node applies a different sounding reference signal configuration than the base station, for instance, the relay node's transmission of a sounding reference signal in the incorrect subframe will cause unnecessary interference, and that sounding reference signal will not be usable by the base station 20. But, the interference will not break the relay node's connection to the base station 20, or cause significant problems for the mobile terminals 40.

Thus, the system information processor 38 in some embodiments is configured to identify whether or not each received system information change belongs to a fundamental class or a non-fundamental class. Then, the processor 38 determines, for each change, whether to apply the change immediately or to defer application of that change, based on the class to which the change belongs. If a change belongs to the non-fundamental class, the processor 38 determines to apply the change immediately (e.g., at time T1 in FIG. 2). However, if the change belongs to the fundamental class, the processor 38 determines to defer application until the set time period (e.g., until the next modification period P2, which starts at time T2 in FIG. 2). Accordingly, in systems that most often change non-fundamental system information as opposed to fundamental system information, the processor 38 most often utilizes the less complex immediate application procedure, while only occasionally utilizing the deferred application procedure to ensure preservation of ongoing communications.

In some embodiments, the system information processor 38 makes the determination between immediate and deferred application of received changes based on rules that are pre-configured in the relay node 30 (e.g., in memory 35). Such rules may specify, for example, which changes belong to which classes (e.g., fundamental or non-fundamental), in accordance with the above description. In this case, the processor 38 identifies to which class each change belongs based on the class specification preconfigured in the relay node 30.

Preconfigured rules in the relay node 30 may alternatively or additionally specify certain conditions under which the processor 38 is to employ immediate application, and other conditions under which the processor 38 is to employ deferred application. The processor 38 thus evaluates one or more specified conditions and employs immediate or deferred application in accordance with the pre-configured rules and the evaluated conditions.

In at least one embodiment, the conditions specified by the preconfigured rules include the current load of the relay node 30. The current load may of course be directly or indirectly indicated by various parameters, such as the number of mobile terminals 40 currently connected to the relay node 30 or even the current time of day. Regardless, the system information processor 38 in these embodiments evaluates the current load and determines to employ immediate application of changes under certain loading conditions, but to employ deferred application under other loading conditions. In this regard, the processor 38 may employ immediate application under relatively low loading conditions (when there is greater tolerance for any resulting interference increase and therefore less risk of disrupting ongoing communications), but employ deferred application under relatively high loading conditions.

The conditions specified by the preconfigured rules may similarly include quality of service (QoS) requirements of one or more mobile terminals 40. The QoS requirements may be indicated by parameters such as bit error rate, block error rate, or the like. The system information processor 38 evaluates the QoS requirements and determines to employ immediate application of changes under certain QoS requirements, but to employ deferred application under other QoS requirements. For example, the processor 38 may employ immediate application when the evaluated QoS requirements are relatively low (so as to permit any possible performance decrease that may result), but employ deferred application when the evaluated QoS requirements are relatively high.

In other embodiments, the system information processor 38 makes the determination between immediate and deferred application of received changes based on one or more explicit control indicators received from the base station 20. In some of these embodiments, interface 32 is configured to receive a message from the base station 20 that not only includes the system information changes, but also includes one or more control indicators. In others of these embodiments, interface 32 is configured to receive the one or more control indicators in a separate message from the system information changes. Regardless, the system information processor 38 determines one or more values of the control indicators, and makes the determination between immediate and deferred application of the received changes depending on the determined one or more values.

Thus, the system information processor's determination in these latter embodiments entails interpreting or otherwise recognizing control indicators received from the base station 20 that explicitly direct the relay node 30 to employ immediate application or deferred application. Correspondingly, the base station 20 in these embodiments may be configured to generate the one or more control indicators in any of the ways described above with respect to the relay node 30.

Specifically, the base station 20 in one or more embodiments includes interface 22 towards the relay node 20. Interface 22 is thus configured to communicate with the relay node 30. The base station may also include interface 28, for communicating with mobile terminals directly, without the relay node 30. Regardless, the base station 20 also includes one or more processing circuits 24, which include a system information controller 26. The system information controller 26 is configured to identify system information changes to be sent to the relay node 30. The controller 26 is then configured to generate one or more control indicators that indicate whether the relay node 30 is to apply the identified system information changes immediately upon reception of those changes, or to defer application until a set time period. Finally, the controller 26 is configured to send to the relay node 30, via interface 22, one or more messages that include the identified system information changes and the one or more control indicators.

As suggested above, the controller 26 in some embodiments is configured to generate the one or more control indicators to indicate that the relay node 30 is to apply all of the identified changes immediately, or to defer application of all of the identified changes. Alternatively, the controller 26 may generate the one or more control indicators to indicate that the relay node 30 is to apply some of the identified changes immediately, and to defer application of others of the identified changes. In this alternative, the one or more indicators therefore direct the relay node 30 on a change-by-change basis rather than on a message-by-message basis.

Also as suggested above, the controller 26 may distinguish between different changes by recognizing changes as belonging to one of a plurality of different classes. These different classes may categorize system information changes, for example, based on the general type of system information being changes (e.g., system-wide information versus cell-specific information, or, as explained in more detail below, fundamental information versus non-fundamental information). Thus, the controller 26 in these embodiments identifies to which of a plurality of different classes each change belongs. Then, the controller 26 generates the one or more control indicators, based on the class to which each change belongs, to indicate whether the relay node 30 is to apply that particular change immediately or to defer application of that change.

In some embodiments, the different classes include fundamental and non-fundamental system information changes, as discussed above with respect to the relay node 30. In such case, the controller 26 is configured to generate the one or more control indicators to indicate that the relay node 30 is to apply non-fundamental changes immediately and to defer application of fundamental changes. For example, the controller 26 may generate the one or more control indicators to simply indicate that the relay node is to employ immediate application for certain changes (determined by the controller 26 as being non-fundamental) and to employ deferred application for other changes (determined by the controller 26 as being fundamental). Alternatively, the controller 26 may generate the one or more control indicators to indicate whether each change is fundamental or non-fundamental, and to indicate that the relay node 30 is to employ immediate application for changes identified as non-fundamental and to employ deferred application for changes identified as fundamental. Both of these alternatives of course equally apply to embodiments that include different classes other than non-fundamental and fundamental.

Similarly to the relay node 30 in embodiments above, the base station 20 may determine whether to generate the one or more control indicators to indicate immediate application or deferred application based on rules that are preconfigured in the base station 20 (e.g., in memory 25). Again, such rules may specify which changes belong to which classes (e.g., fundamental or non-fundamental). The rules may alternatively or additionally specify certain conditions under which the controller 26 is to indicate immediate application, and other conditions under which the controller 26 is to indicate deferred application. These conditions may include the current load of the relay node 30 and/or quality of service requirements of one or more mobile terminals 40.

In embodiments where the set time period comprises the next modification period in a series of recurring modification periods (as illustrated in FIG. 2 for relay node embodiments), the system information controller 26 at the base station 20 is configured to itself defer application of the identified system information changes until the set time period (e.g., to apply the system information changes at the beginning of the set time period). This way, the base station 20 at least synchronously applies the system information changes with mobile terminals 40.

Those skilled in the art will of course appreciate that the above embodiments have been described as non-limiting examples, and have been simplified in many respects for ease of illustration. For instance, descriptions above have generalized communications between the base station 20 and the relay node 30 as simply occurring over a radio link 12. Likewise descriptions above have generalized communications between the relay node 30 and mobile terminals 40 as occurring over radio link 14. In more detail, though, the relay node 30 in some embodiments uses the same frequency for both of these radio links 12, 14, and thus cannot use both links 12, 14 at the same time without experiencing prohibitive levels of interference. That is, the relay node 30 comprises an "in-band" relay node. In this case, much of the communication discussed above between the base station 20 and the relay node 30 occurs through dedicated signaling (e.g., the system information changes and, where applicable, control indicators are communicated via dedicated signaling).

Also, the above embodiments have not been described in the context of any particular type of wireless communication system. In this regard, no particular communication interface standard is necessary for practicing the present invention. That is, the wireless communication system 10 may be any one of a number of standardized system implementations that support relaying of communications between a base station and mobile terminals via a relay node. As one particular example, the system 10 may implement Long Term Evolution (LTE) or LTE-Advanced standards. In this case, the base station 20 may be referred to as an evolved Node-B, or eNB, the mobile terminals 40 may be referred to as user equipment, or UE, and the relay node 30 may otherwise conform to LTE standards specified in a technical specification titled "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)," 3GPP TS 36.300, v. 9.2.0 (7 Jan. 2010). System information may thus need to change, to name just a few examples: (1) when the base station 20 starts a new multimedia broadcast single frequency network (MBSFN) service requiring the allocation of a specific MBSFN sub-frame allocation that cannot be used by other services; (2) when the system 10 is congested and the base station 20 needs to bar some services or users from accessing the system 10; or (3) when the base station 20 needs to increase or decrease the capacity of some control channel (e.g., the Random Access Channel RACH, or the Physical Uplink Control Channel, PUCCH).

With the above described modifications and variations in mind, those skilled in the art will understand that a relay node 30 herein generally performs the processing illustrated in FIG. 3, for relaying communications between a base station 20 and one or more mobile terminals 40 in a wireless communication system 10. Processing in FIG. 3 includes receiving a message from the base station that includes system information changes (Block 100). Processing further includes determining whether to apply the system information changes immediately or to defer application until a set time period (Block 110). Finally, processing includes applying the system information changes at a time in accordance with that determining (Block 120).

Also, those skilled in the art will understand that a base station 20 herein, in one or more embodiments, generally performs the processing illustrated in FIG. 4, for propagating system information changes to a relay node 30 that relays communications between the base station 20 and one or more mobile terminals 40. The processing includes identifying system information changes to be sent to the relay node 30 (Block 200). Processing also includes generating one or more control indicators that indicate whether the relay node 30 is to apply the identified system information changes immediately upon reception of those system information changes, or to defer application until a set time period (Block 210). Processing then includes sending to the relay node 30 one or more messages that include the identified system information changes and the one or more control indicators (Block 220).

Those skilled in the art will also appreciate that the various "circuits" described may refer to a combination of analog and digital circuits, and/or one or more processors configured with software stored in memory 25, 35 and/or firmware stored in memory 25, 35 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a base station of a wireless communication system for propagating system information changes to a relay node that relays communications between the base station and one or more mobile terminals, the method comprising:
   identifying system information changes to be sent to the relay node;
   generating one or more control indicators that indicate whether the relay node is to apply the identified system information changes, by updating one or more parameters stored at the relay node with those changes, immediately upon reception of those system information changes or to defer said application and thereby said updating of the one or more parameters until a set time period; and sending to the relay node one or more messages that include the identified system information changes and the one or more control indicators.

2. The method of claim 1, further comprising deferring application of the system information changes at the base station until the set time period.

3. The method of claim 1, wherein said generating comprises determining whether the relay node is to apply the identified system information changes immediately upon reception of those system information changes or to defer application until the set time period, based on at least one of:
the current load of the relay node; and
quality of service requirements of said one or more mobile terminals.

4. The method of claim 1, wherein said generating comprises generating the one or more control indicators to indicate that the relay node is to apply some of the identified system information changes immediately upon reception of those system information changes and to defer application of others of the identified system information changes until the set time period.

5. The method of claim 1, wherein said generating comprises:
identifying to which of a plurality of different classes each identified system information change belongs; and
generating the one or more control indicators, based on the class to which each system information change belongs, to indicate whether the relay node is to apply that particular system information change immediately upon reception or to defer application of the system information change until the set time period.

6. The method of claim 5, wherein said classes include fundamental and non-fundamental system information changes, wherein fundamental system information changes fatally disrupt ongoing communications if applied by the relay node before the set time period, and wherein said generating comprises generating the one or more control indicators to indicate that the relay node is to apply non-fundamental system information changes immediately upon reception and to defer application of fundamental system information changes until the set time period.

7. The method of claim 1, wherein the one or more control indicators indicate whether a relay node engaged in ongoing communications with the base station and/or the one or more mobile terminals is to apply the identified system information changes immediately upon reception of those system information changes or to defer application until the set time period.

8. The method of claim 1, wherein the set time period is the next time period in a series of time periods that recur with a periodicity set by the wireless communication system.

9. A base station in a wireless communication system, the base station comprising:
an interface towards a relay node that relays communications between the base station and one or more mobile terminals; and
one or more processing circuits, including a system information controller configured to:
identify system information changes to be sent to the relay node;
generate one or more control indicators that indicate whether the relay node is to apply the identified system information changes, by updating one or more parameters stored at the relay node with those changes, immediately upon reception of those system information changes or to defer said application and thereby said updating of the one or more parameters until a set time period; and
send to the relay node, via said interface, one or more messages that include the identified system information changes and the one or more control indicators.

10. The base station of claim 9, wherein the system information controller is further configured to defer application of the system information changes at the base station until the set time period.

11. The base station of claim 9, wherein the system information controller is configured to determine whether the relay node is to apply the system information changes immediately upon reception of those system information changes or to defer application until the set time period, based on at least one of:
the current load of the relay node; and
quality of service requirements of said one or more mobile terminals.

12. The base station of claim 9, wherein the system information controller is configured to generate the one or more control indicators to indicate that the relay node is to apply some of the identified system information changes immediately upon reception of those system information changes and to defer application of others of the identified system information changes until the set time period.

13. The base station of claim 9, wherein the system information controller is configured to:
identify to which of a plurality of different classes each received system information change belongs; and
generate the one or more control indicators, based on the class to which each system information change belongs, to indicate whether the relay node is to apply that particular system information change immediately upon reception or to defer application of the system information change until the set time period.

14. The base station of claim 13, wherein said classes include fundamental and non-fundamental system information changes, wherein fundamental system information changes fatally disrupt ongoing communications if applied by the relay node before the set time period, and wherein the system information controller is configured to generate the one or more control indicators to indicate that the relay node is to apply non-fundamental system information changes immediately upon reception and to defer application of fundamental system information changes until the set time period.

15. The base station of claim 9, wherein the one or more control indicators indicate whether a relay node engaged in ongoing communications with the base station and/or the one or more mobile terminals is to apply the identified system information changes immediately upon reception of those system information changes or to defer application until the set time period.

16. The base station of claim 9, wherein the set time period is the next time period in a series of time periods that recur with a periodicity set by the wireless communication system.

* * * * *

UNITED STATES PATENT AND TRADEMARK OFFICE
CERTIFICATE OF CORRECTION

| | | |
|---|---|---|
| PATENT NO. | : 8,886,114 B2 | Page 1 of 1 |
| APPLICATION NO. | : 13/090471 | |
| DATED | : November 11, 2014 | |
| INVENTOR(S) | : Mildh et al. | |

It is certified that error appears in the above-identified patent and that said Letters Patent is hereby corrected as shown below:

On the Title Page, below Item (60), in Column 1, insert -- (30) Foreign Application Priority Data
April 1, 2011 (SE).....................PCT/SE2011/050387 --.

Signed and Sealed this
First Day of December, 2015

Michelle K. Lee
*Director of the United States Patent and Trademark Office*